United States Patent
Lee et al.

(10) Patent No.: US 10,658,641 B2
(45) Date of Patent: May 19, 2020

(54) SEPARATOR COMPRISING COATING LAYER, AND BATTERY USING SAME

(71) Applicant: SAMSUNG SDI CO., LTD., Yongin-si, Gyeonggi-do (KR)

(72) Inventors: Byung Min Lee, Suwon-si (KR); Ha Na Kim, Suwon-si (KR); Nam Hyo Kim, Suwon-si (KR); Myung Kook Park, Suwon-si (KR); Hyeon Sun Choi, Suwon-si (KR)

(73) Assignee: Samsung SDI Co., Ltd., Yongin-Si, Gyeonggi-do (KR)

(*) Notice: Subject to any disclaimer, the term of this patent is extended or adjusted under 35 U.S.C. 154(b) by 194 days.

(21) Appl. No.: 15/038,274

(22) PCT Filed: Nov. 21, 2014

(86) PCT No.: PCT/KR2014/011252
§ 371 (c)(1),
(2) Date: May 20, 2016

(87) PCT Pub. No.: WO2015/076611
PCT Pub. Date: May 28, 2015

(65) Prior Publication Data
US 2016/0301055 A1    Oct. 13, 2016

(30) Foreign Application Priority Data

Nov. 21, 2013   (KR) .................. 10-2013-0142324
Apr. 7, 2014    (KR) .................. 10-2014-0041124

(51) Int. Cl.
*H01M 2/16*     (2006.01)
*H01M 10/052*   (2010.01)
(Continued)

(52) U.S. Cl.
CPC ......... *H01M 2/1686* (2013.01); *C08F 218/08* (2013.01); *C08J 7/042* (2013.01);
(Continued)

(58) Field of Classification Search
None
See application file for complete search history.

(56) References Cited

U.S. PATENT DOCUMENTS

2003/0039886 A1   2/2003   Zhang et al.
2009/0123828 A1   5/2009   Kono et al.
(Continued)

FOREIGN PATENT DOCUMENTS

CN    101872853 A    10/2010
JP    2002-256129    9/2002
(Continued)

OTHER PUBLICATIONS

USPTO Office action dated Sep. 27, 2017, in U.S. Appl. No. 15/038,306.
(Continued)

*Primary Examiner* — Robert S Carrico
(74) *Attorney, Agent, or Firm* — Lee IP Law, PC

(57) ABSTRACT

The present invention relates to a separator comprising a coating layer and a battery using the same, the separator having improved adhesive force to an electrode, thereby minimizing the rate of thickness change. More specifically, the present invention relates to a separator having a coating layer on one or both surfaces of a base film, the coating layer comprising an acrylic-based copolymer having a glass transition temperature of less than or equal to 80° C. and an inorganic particle, so as to have improved adhesive force and heat resistance, thereby being applicable in electro-chemical batteries of various sizes and having excellent thermal stability and dimensional stability.

10 Claims, 2 Drawing Sheets

(51) Int. Cl.

| | | |
|---|---|---|
| *C09D 127/16* | (2006.01) | |
| *C08F 218/08* | (2006.01) | |
| *C09J 133/08* | (2006.01) | |
| *C08J 7/04* | (2020.01) | |
| *C08L 27/16* | (2006.01) | |
| *H01M 4/04* | (2006.01) | |
| *H01M 4/131* | (2010.01) | |
| *H01M 4/133* | (2010.01) | |
| *H01M 4/1391* | (2010.01) | |
| *H01M 4/1393* | (2010.01) | |
| *H01M 4/525* | (2010.01) | |
| *H01M 4/587* | (2010.01) | |
| *H01M 4/62* | (2006.01) | |
| *H01M 10/0525* | (2010.01) | |
| *H01M 10/0565* | (2010.01) | |
| *H01M 10/058* | (2010.01) | |
| *C09J 131/04* | (2006.01) | |
| *C09J 133/06* | (2006.01) | |
| *H01M 4/02* | (2006.01) | |

(52) U.S. Cl.
CPC ............ *C08L 27/16* (2013.01); *C09D 127/16* (2013.01); *C09J 131/04* (2013.01); *C09J 133/06* (2013.01); *C09J 133/08* (2013.01); *H01M 2/162* (2013.01); *H01M 2/166* (2013.01); *H01M 2/168* (2013.01); *H01M 2/1653* (2013.01); *H01M 2/1673* (2013.01); *H01M 4/0404* (2013.01); *H01M 4/0435* (2013.01); *H01M 4/131* (2013.01); *H01M 4/133* (2013.01); *H01M 4/1391* (2013.01); *H01M 4/1393* (2013.01); *H01M 4/525* (2013.01); *H01M 4/587* (2013.01); *H01M 4/622* (2013.01); *H01M 4/623* (2013.01); *H01M 4/625* (2013.01); *H01M 10/052* (2013.01); *H01M 10/058* (2013.01); *H01M 10/0525* (2013.01); *H01M 10/0565* (2013.01); *C08J 2323/06* (2013.01); *C08J 2427/16* (2013.01); *C08J 2433/10* (2013.01); *H01M 2004/021* (2013.01); *H01M 2004/027* (2013.01); *H01M 2004/028* (2013.01); *H01M 2220/30* (2013.01)

(56) References Cited

U.S. PATENT DOCUMENTS

| | | | |
|---|---|---|---|
| 2009/0208838 A1 | 8/2009 | Kim | |
| 2010/0316903 A1 | 12/2010 | Kim et al. | |
| 2011/0195294 A1* | 8/2011 | Lee | H01M 2/145 429/144 |
| 2013/0130123 A1* | 5/2013 | Kaneda | H01M 2/16 429/233 |
| 2013/0183519 A1 | 7/2013 | Maeda | |
| 2013/0189561 A1 | 7/2013 | Kim et al. | |
| 2013/0224552 A1 | 8/2013 | Hong et al. | |
| 2013/0224556 A1* | 8/2013 | Hong | H01M 2/1686 429/144 |
| 2014/0308565 A1* | 10/2014 | Lee | H01M 2/1686 429/144 |
| 2015/0372277 A1 | 12/2015 | Honda et al. | |

FOREIGN PATENT DOCUMENTS

| | | | | |
|---|---|---|---|---|
| JP | 2004-063343 | A | 2/2004 | |
| JP | 2011-162603 | A | 8/2011 | |
| JP | 2012-089444 | A | 5/2012 | |
| JP | 2013-101954 | A | 5/2013 | |
| JP | 2013-168373 | A | 8/2013 | |
| JP | 2013-197078 | | 9/2013 | |
| JP | 2014-026986 | | 2/2014 | |
| JP | 2014-063343 | | 4/2014 | |
| KR | 10-2001-0012587 | | 2/2001 | |
| KR | 10-2006-0072065 | | 6/2006 | |
| KR | 10-0727248 | B1 | 6/2007 | |
| KR | 10-2007-0077231 | A | 7/2007 | |
| KR | 10-2007-0104689 | | 10/2007 | |
| KR | 10-2008-0101043 | A | 11/2008 | |
| KR | 10-2009-0063445 | A | 6/2009 | |
| KR | 2009-0056811 | A | 6/2009 | |
| KR | 10-2010-0059933 | | 6/2010 | |
| KR | 10-2011-0056911 | | 5/2011 | |
| KR | 10-2011-0057079 | A | 5/2011 | |
| KR | 10-2011-0104791 | A | 9/2011 | |
| KR | 10-2012-0025619 | | 3/2012 | |
| KR | 10-2012-0012397 | | 10/2012 | |
| KR | 10-2012-0108686 | | 10/2012 | |
| KR | 10-2013-0066746 | | 6/2013 | |
| KR | 10-2013-0067684 | A | 6/2013 | |
| KR | 10-2013-083211 | | 7/2013 | |
| KR | 10-2013-0092245 | A | 8/2013 | |
| KR | 10-2013-0093977 | | 8/2013 | |
| KR | 10-2013-0096138 | | 8/2013 | |
| KR | 10-2013-0099545 | A | 9/2013 | |
| KR | 10-2013-0114926 | | 10/2013 | |
| KR | 10-2013-0123568 | A | 11/2013 | |
| KR | 10-2013-0126445 | | 11/2013 | |
| KR | 2014-0055901 | A | 5/2014 | |
| WO | WO-2014147888 | A1 * | 9/2014 | .......... H01M 2/1653 |

OTHER PUBLICATIONS

USPTO Office action dated Aug. 15, 2017, in U.S. Appl. No. 15/038,352.
International Search Report for PCT/KR2014/011178.
International Search Report for PCT/KR2014/011179.
International Search Report for PCT/KR2014/011180.
International Search Report for PCT/KR2014/011234.
U.S. Office Action dated Dec. 20, 2017, in copending U.S. Appl. No. 15/038,352.
U.S. Office Action dated Jan. 31, 2018, in copending U.S. Appl. No. 15/038,306.
U.S. Office Action dated Apr. 30, 2018, in copending U.S. Appl. No. 15/038,352.
Liao, Self-Supported Poly(Methyl Methacrylate-acrylonitrile-Vinyl Acetate)-Based Gell Electrolyte for Lithium ion Battery, 189 Journal of Power Sources 139-144 (2009).
U.S. Office Action dated Jul. 9, 2019, in copending U.S. Appl. No. 15/038,352.
U.S. Office Action dated Oct. 15, 2019, in copending U.S. Appl. No. 15/038,352.

\* cited by examiner

SEPARATOR COMPRISING COATING LAYER, AND BATTERY USING SAME

CROSS REFERENCE TO RELATED APPLICATIONS

This is the U.S. national phase application based on PCT Application No. PCT/KR2014/011252, filed Nov. 21, 2014, which is based on Korean Patent Application Nos. 10-2013-0142324, filed Nov. 21, 2013 and 10-2014-0041124, filed Apr. 7, 2014, the entire contents of all of which are hereby incorporated by reference.

BACKGROUND OF THE INVENTION

1. Field of the Invention

The present invention relates to a separator including a coating layer and a battery using the same.

2. Description of the Related Art

A separator for an electrochemical battery is an interlayer that separates a positive electrode from a negative electrode in a battery and continuously maintains ion conductivity to enable charge and discharge of a battery.

Recently, a large-sized separator has been manufactured, as an electrochemical battery having a larger area has been required in accordance with enlargement of a panel along with tendency of lightening and thinness of the electrochemical battery in order to increase portability of an electronic device.

However, the large-sized separator wound with electrodes may be easily detached due to an increase of the area and/or weight during a process of manufacturing an electrode assembly by interposing the large-sized separator between the electrodes and pressing them and thus deteriorate shape stability during a process of being allowed to stand or packing a battery. Accordingly, adherence of the separator needs to be increased.

In addition, the separator for a large electrochemical battery simultaneously requires excellent thermal stability to produce a high-capacity battery as well as the increased adherence to the electrodes.

In this regard, a method of forming an organic/inorganic mixed coating layer on one surface or both surfaces of a base film of the separator in order to improve adherence and heat resistance is known (Korean Registration Patent No. 10-0775310) but may not sufficiently secure adherence and thus not be uniformly applied to a separator having various sizes and shapes.

Accordingly, development of a separator having applicable properties such as adherence, a thermal shrinkage ratio, and the like to the large-sized electrochemical battery is required.

SUMMARY OF THE INVENTION

Technical Object

The purpose of the present invention is to provide a separator that is applicable to an electrochemical battery having various sizes and/or shapes.

Specifically, the present invention is to provide a separator having sufficient adherence enough to easily perform a process of manufacturing a large-sized separator and thus securing shape stability during the process of manufacturing the separator and/or simultaneously improved thermal stability, and a battery using the same.

Technical Solution

According to one aspect of the present invention, a separator includes a base film and a coating layer including an organic binder and an inorganic particle on one surface or both surfaces of the base film, wherein a rate of a thickness change of the separator according to Equation 1 is less than or equal to 3%.

$$\text{Rate of a thickness change (\%)} = [(T_2 - T_1)/T_1] \times 100 \quad \text{[Equation 1]}$$

In Equation 1, $T_1$ is a thickness of an electrode assembly that is provided by interposing a separator between a positive electrode and a negative electrode, sequentially stacking the positive electrode, the separator, and the negative electrode, winding the stack several times to have a size of 7 cm (length)×6.5 cm (width) to provide a jelly-roll shaped electrode assembly, and pressing the electrode assembly at 60° C. to 100° C. with a pressure of 10 kgf/cm² to 50 kgf/cm² for 1 second to 5 seconds, and $T_2$ is a thickness of an electrode assembly that is provided by being allowed to stand at 15° C. to 30° C. for 48 hours after the pressing.

According to another aspect of the present invention, a separator includes a base film and a coating layer including an acryl-based copolymer having a glass transition temperature (Tg) of less than or equal to 80° C. and an inorganic particle, on one surface or both surfaces of the base film.

According to another aspect of the present invention, an electrochemical battery includes a positive electrode, a negative electrode, an electrolyte, and a separator between the positive electrode and the negative electrode, wherein the separator is the separator according to one aspect of the present invention.

Advantageous Effect

According to example embodiments of one aspect of the present invention, a separator may be stored for a long time by securing sufficient adherence and thus minimizing a rate of a thickness change even after manufacturing the separator and may improve shape stability during a process of packing a battery.

In addition, the separator according to the example embodiments of one aspect of the present invention may be prevented from being detached during a process of winding the separator and/or manufacturing an electrode assembly and thus reduce a process inferiority rate and simultaneously, show no deteriorated thermal shrinkage ratio and thus appropriate heat resistance.

In addition, when the separator according to the example embodiments of one aspect of the present invention is applied to a battery, the separator may have an organic-inorganic mixed coating layer on one surface or both surfaces of a base film and thus show excellent adherence and heat resistance as well as excellent storage stability and resultantly may suppress a shrinkage of the base film and thus provide a battery having much improved performance.

DETAILED DESCRIPTION

Figure 1:
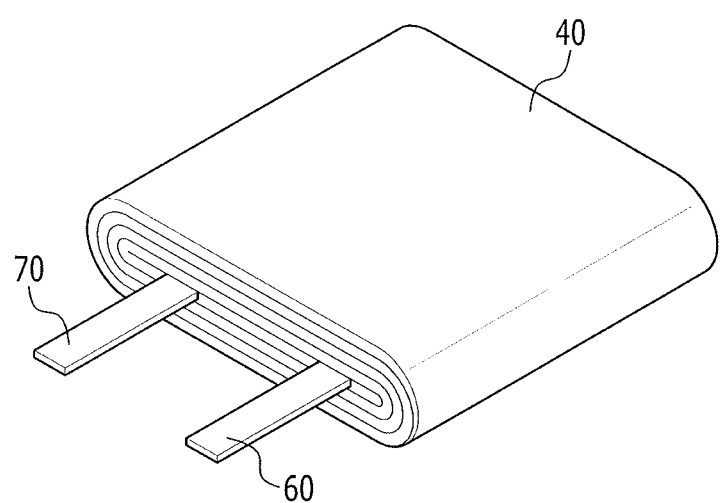
FIG. 1 is a perspective view showing an electrode assembly for measuring a rate of a thickness change of Examples according to one aspect of the present invention.

Hereinafter, the present invention is described in detail. The disclosures that are not described in the present specification may be fully recognized and by conveyed by those skilled in the art in a technical or similar field of the present invention and thus are omitted herein.

A separator according to an example embodiment of one aspect includes a base film and a coating layer formed on one surface or both surfaces of the base film.

Hereinafter, each composition of the base film and the coating layer according to an example embodiment of one aspect is specifically described.

Base Film

The base film of the separator according to an example embodiment of one aspect is not particularly limited, but may be a polymer film including one polymer selected from polyethylene, polypropylene, polyethyleneterephthalate, polybutyleneterephthalate, polyester, polyacetal, polyimide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylenesulfide, and polyethylenenaphthalene or a mixture of two or more polymers. For example, the base film may be a polyolefin-based base film, and the polyolefin-based base film may improve safety of a battery due to its improved shut-down function. The polyolefin-based base film may be, for example, selected from a polyethylene single film, a polypropylene single film, a polyethylene/polypropylene double film, a polypropylene/polyethylene/polypropylene triple film, and a polyethylene/polypropylene/polyethylene triple film. For another example, the polyolefin-based base film may include a non-olefin resin in addition to an olefin resin or a copolymer of olefin and a non-olefin monomer.

In addition, a thickness, a composition, and a content of the base film are not particularly limited and may be adjusted according to purposes. Specifically, the thickness of the base film may be 1 μm to 40 μm, for example 5 μm to 15 μm. Within the thickness range, a separator may have a desirable thickness that is thick to prevent a short-circuit between the positive electrode and the negative electrode of a battery and is also not thick to increase internal resistance.

Coating Layer

The coating layer according to an example embodiment of one aspect may be formed in a form of coating liquid on one surface or both surfaces of the base film, and the coating liquid may include a binder, an inorganic particle, and a solvent.

A. Binder

A binder according to an example embodiment of the present aspect may be an organic binder, for example, an acryl-based copolymer. Specifically, the acryl-based copolymer may be a copolymerized compound of two or more (meth)acrylate monomers, or a copolymerized compound of a (meth)acrylate monomer and other copolymerizable monomers. The (meth)acrylate monomer may be one selected from methyl (meth)acrylate, ethyl (meth)acrylate, propyl(meth)acrylate, butyl (meth)acrylate, or a mixture thereof, but is not limited thereto. Other copolymerizable monomers with the (meth)acrylate monomer may include any monomer having desired adherence at a compression temperature between positive and negative electrodes without a particular limit but an acetate group-containing monomer, for example, vinyl acetate or allyl acetate.

The acryl-based copolymer copolymerized with the monomers may be used to secure heat resistance as well as sufficient adherence during a process of disposing the separator between electrodes and compressing them. When the acryl-based copolymer having a repeating unit derived from a (meth)acrylate-based monomer and/or an acetate group-containing monomer is used as an organic binder for a coating layer, adherence of the separator to the electrodes are more improved than when a polyvinylidene fluoride-based binder is used alone, and thus when the acryl-based copolymer is applied to a large-sized separator, a process may not only be easily performed, but battery safety may also be improved by improving adherence of the separator to the electrodes and thus increasing heat resistance and preventing shrinkage of the separator and resultantly, improving shape stability as well as facilitate a process. In addition, when the acryl-based copolymer is used, excellent shape storage stability is secured during a process of manufacturing an electrode assembly or packing a pouch-type battery by minimizing a rate of a thickness change, even though allowed to stand for a long time under a predetermined condition in a jelly-roll state.

Specifically, the acryl-based copolymer may be prepared by copolymerizing the (meth)acrylate-based monomer and acetate group-containing monomer in a mole ratio of 3:7 to 7:3, specifically 4:6 to 6:4, and more specifically about 5:5. More specifically, the acryl-based copolymer may be a copolymer of a butyl (meth)acrylate monomer, a methyl (meth)acrylate monomer, and a vinyl acetate monomer. For example, it may be prepared by polymerizing a butyl (meth)acrylate monomer, a methyl (meth)acrylate monomer, and a vinyl acetate monomer in a mole ratio of 3.5 to 4.5:0.5 to 1.5:4 to 6, and specifically, 4:1:5. The acryl-based copolymer prepared in the mole ratio may have a glass transition temperature (Tg) of less than or equal to about 80° C., specifically, 0° C. to 70° C., more specifically, 20° C. to 60° C., for example, 30° C. to 50° C. Within the range, good adherence may be realized at a temperature where a separator positioned between electrodes is compressed, and thus a shrinkage ratio may be improved and heat resistance may be increased.

A content of the acryl-based copolymer may be 0.1 wt % to 40 wt %, and specifically 1 wt % to 30 wt % based on a total solid weight of the coating layer. Within the range, a rate of a thickness change may be minimized while improving adherence.

B. Inorganic Particle

Kinds of the inorganic particle of the coating layer according to an example embodiment of one aspect is not particularly limited, and may be an inorganic particle that is generally in this filed. Non-limiting examples of the inorganic particle may be $Al_2O_3$, $SiO_2$, $B_2O_3$, $Ga_2O_3$, $TiO_2$, or $SnO_2$. These may be used alone or in a mixture of two or more. For example, $Al_2O_3$ (alumina) may be used.

In the coating layer, the inorganic particle may be included in an amount of 60 wt % to 99 wt %, and specifically 70 wt % to 95 wt % based on a total solid weight of the coating layer. When the inorganic particle is included within the range, the inorganic particle may sufficiently exert heat dissipation properties, and when used to coat a separator, the separator may be effectively suppressed from a thermal shrinkage.

The inorganic particle has no particular limit about a size but may have an average particle diameter ranging from 100 nm to 1000 nm and specifically, 300 nm to 600 nm. When the inorganic particle has a size within the range, dispersity and coating processibility of the inorganic particle in a coating liquid may be prevented from deterioration, and thickness of a coating layer may be appropriately adjusted.

C. Solvent

When a coating liquid for forming a coating layer of a separator is prepared, the binder and the inorganic particle may be used as a polymer solution and an inorganic dispersion liquid, respectively, obtained by dispersing them in an appropriate solvent. The appropriate solvent has no particular limit but may include any solvent commonly used in a related art. The appropriate solvent may be a low boiling point solvent, a high boiling point solvent, or additionally the high boiling point solvent along with the low boiling point solvent.

Non-limiting example of the low boiling point solvent may be acetone, tetrahydrofuran (THF), and the like, which may be used alone or in a mixture of two or more.

Non-limiting example of the high boiling point solvent may be dimethyl formamide (DMF), dimethyl sulfoxide (DMSO), dimethyl acetamide (DMAc), dimethylcarbonate (DMC) or N-methylpyrrolidone (NMP), which may be used alone or in a mixture of two or more.

A content of the solvent may be 20 wt % to 99 wt %, specifically 50 wt % to 95 wt %, and more specifically 70 wt % to 95 wt % based on a weight of the coating liquid. When the solvent is used within the range, the coating liquid is easy to prepare, and a process of drying the coating layer may be smoothly performed.

A thickness of the coating layer according to an example embodiment of one aspect may be 0.1 μm to 10 μm and specifically, 1 μm to 5 μm. The entire thickness of a separator may be prevented from being extremely thick within the thickness range to suppress mechanical properties from being deteriorated and electrical resistance from being increased.

Hereinafter, a method of manufacturing a separator according to an example embodiment of one aspect is described. The separator according to an example embodiment of the present invention may be formed by coating the coating liquid including the binder and the inorganic particle on one surface or both surfaces of a base film and drying the coating liquid.

Specifically, the coating layer is formed by preparing the coating liquid including the binder including the acryl-based copolymer, the inorganic particle, and a solvent and coating the coating liquid on one surface or both surfaces of the base film.

There is no particular limit in preparing the coating liquid according to an example embodiment of the present aspect, but the coating liquid may be prepared by respectively preparing a polymer solution obtained by dissolving the binder in an appropriate solvent and an inorganic dispersion liquid obtained by dispersing the inorganic particle and then, mixing them with an appropriate solvent.

Subsequently, the mixture of the polymer solution, the inorganic dispersion liquid, and the solvent may be sufficiently stirred with a ball mill, a bead mill, a screw mixer, or the like to prepare the coating liquid as a mixture.

The coating of the coating liquid including the binder and/or the inorganic particle on the base film has no particular limit but may be performed in a common method used in a related art to the present invention. Non-limiting examples of the coating method may be a dip coating, die coating, roll coating, or comma coating method, which may be used alone or in combination thereof. For example, a coating layer may be formed using a dip coating method.

After coating the coating liquid on the base film, the coating liquid may be dried. The drying of the coating liquid may be performed in a common method in a related art to the present invention without particular limit.

Specifically, the drying of the coating layer in an example embodiment of the present aspect may be performed through drying with warm air, hot air, or low humid air, vacuum-drying, or radiation of a far-infrared ray, an electron beam. A drying temperature may be different according to the kind of the solvent but the drying may be performed at 60° C. to 120° C. for 1 minute to 1 hour. For example, it may be performed at 60° C. to 100° C. for 1 minute to 30 minutes, or 1 minute to 10 minutes.

Hereinafter, a separator according to another example embodiment of the present aspect is described. The separator according to the present example embodiment may be different from the aforementioned separator according to the example embodiment of the present aspect in that other binders in addition to the acryl-based copolymer are added as a coating layer binder. Accordingly, a composition and a method of manufacturing the separator except for the coating layer binder are substantially the same as the aforementioned example embodiment, and thus the other binders are mainly described. The organic binder of the coating layer for the separator according to another example embodiment of the present aspect additionally includes the other binders than the acryl-based copolymer and thus may further improve adherence and heat resistance of the separator.

The binder to be added in addition to the acryl-based copolymer may be selected from a polyvinylidene fluoride (PVDF) homopolymer, a polyvinylidene fluoride-hexafluoropropylene (PVDF-HFP), polyvinylidene fluoride-trichloroethylene (PVDF-TCE), polyvinylidene fluoride-chlorotrifluoroethylene (PVDF-CTFE), polymethyl(meth)acrylate (PMMA), polybutylacrylate (PBA), polyacrylonitrile (PAN), polyvinylpyrrolidone (PVP), polyvinylacetate (PVAc), polyvinyl alcohol (PVAl), a polyethylene vinyl acetate copolymer (polyethylene-co-vinylacetate, PEVA), polyethyleneoxide (PEO), polyarylate (PAR), cellulose acetate (CA), cellulose acetatebutyrate (CAB), cellulose acetate propionate (CAP), cyanoethylpullulan (CYEPL), cyanoethyl polyvinyl alcohol (CRV), cyanoethyl cellulose (CEC), cyanoethyl sucrose (CRU), pullulan, carboxyl methyl cellulose (CMC), polyimide (PI), and polyamic acid (PAA), and when two or more binders are present, a weight average molecular weight (Mw) of each binder may be the same or different as needed.

Specifically, the binder to be added in addition to the acryl-based copolymer may be a polyvinylidene fluoride-based binder such as polyvinylidene fluoride (PVDF) homopolymer, polyvinylidene fluoride-hexafluoropropylene (PVDF-HFP), polyvinylidene fluoride-trichloroethylene (PVDF-TCE), polyvinylidene fluoride-chlorotrifluoroethylene (PVDF-CTFE), and the like.

In another example embodiment of the present aspect, a weight ratio of the acryl-based copolymer and the added binder may be 9:1 to 3:7, specifically 9:1 to 4:6, for example 8:2 to 6:4. When the binder is used along with the acryl-based copolymer within the weight ratio, adherence of the coating layer to a base film may be further reinforced, and shape stability in a jelly-roll state after winding may be much improved.

In an example embodiment, the polyvinylidene fluoride-based binder may have a weight average molecular weight (Mw) of 500,000 g/mol to 1,500,000 g/mol, and specifically, at least one polyvinylidene fluoride-based binder having a weight average molecular weight of less than 1,000,000 g/mol or at least one polyvinylidene fluoride-based binder having a weight average molecular weight of greater than or equal to 1,000,000 g/mol. In another example embodiment, the polyvinylidene fluoride-based binder having a weight average molecular weight of less than 1,000,000 g/mol and the polyvinylidene fluoride-based binder having a weight average molecular weight of greater than or equal to 1,000,000 g/mol may be used together. As described above, when the polyvinylidene fluoride-based binder having a weight average molecular weight of less than 1,000,000 g/mol and the polyvinylidene fluoride-based binder having a weight average molecular weight of greater than or equal to 1,000,000 g/mol may be used together, tensile strength of a separator may be improved.

In addition, a content of the acrylic copolymer may be 0.1 wt % to 40 wt %, and specifically 5 wt % to 30 wt % based on a total solid weight of the coating layer. Within the range, a separator having sufficiently improved electrolyte impregnation may be manufactured by effectively suppressing a thermal shrinkage of the base film and thus provide a battery having efficient electrical output.

The separator according to an example embodiment of the present aspect may have a rate of a thickness change of less than or equal to 3%, and more specifically less than or equal to 2% according to Equation 1.

$$\text{Rate of a thickness change (\%)} = [(T_2-T_1)/T_1] \times 100 \quad \text{[Equation 1]}$$

In Equation 1, $T_1$ is a thickness of an electrode assembly that is provided by interposing a separator between a positive electrode and a negative electrode, sequentially stacking the positive electrode, the separator, and the negative electrode, winding the stack several times to have a size of 7 cm (length)×6.5 cm (width) to provide a jelly-roll shaped electrode assembly, and pressing the electrode assembly at 60° C. to 100° C. with a pressure of 10 kgf/cm$^2$ to 50 kgf/cm$^2$ for 1 second to 5 seconds, and $T_2$ is a thickness of an electrode assembly that is provided by being allowed to stand at 15° C. to 30° C. for 48 hours after the pressing. Specifically, a pressing condition may be a pressure of 25 kgf/cm$^2$ to 35 kgf/cm$^2$ for 2 seconds to 4 seconds at 75° C. to 85° C. at measurement of the rate of a thickness change. In the present specification, a term 'jelly-roll' is a roll of electrode assembly 40 formed by disposing a separator between positive and negative electrodes and winding them before a battery assembly (refer to FIG. 1).

Figure 2:
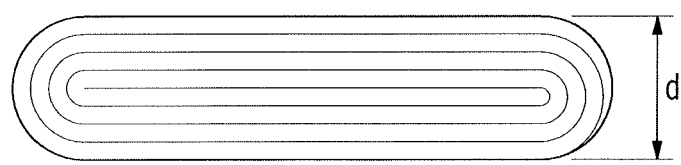
FIG. 2 shows a thickness (d) of an electrode assembly for measuring a rate of a thickness change of Examples according to one aspect of the present invention.

The electrode assembly 40 may include a first tab 60 and a second tab 70 for an electrical connection, and the first tab 60 and the second tab 70 are exposed outside with a predetermined length. The thickness (d) of the electrode assembly may be measured in a thickness direction, but the measurement has no particular limit (refer to FIG. 2).

The rate of a thickness change may be calculated by measuring thickness of the separator after disposing the separator between positive and negative electrodes and pressing them and then, a thickness of the separator after being allowed to stand under a predetermined condition and used to predict or evaluate shape stability in an actual battery after packing an electrode assembly in a polymer battery pouch.

Within the rate range of a thickness change, output characteristics of the battery may be maintained by securing shape storage stability when allowed to stand for a long time under a predetermined condition after the battery assembly as well as shape stability in a jelly-roll shaped electrode assembly state. Accordingly, shape and storage stability of the battery may be secured by improving adherence of the separator without an additional separate process such as a tape attachment to prevent a thickness change of the electrode assembly as times goes, a compression process, and the like. In addition, the separator having the rate of a thickness change within the range may show sufficient adherence in a packing process of a large-sized polymer battery and thus be prevented from being detached due to increased area and/or weight according to enlargement of the separator, promoting process efficiency.

The rate of a thickness change may be measured after winding the separator between the electrodes to manufacture an electrode assembly, compressing the electrode assembly, and allowing it to stand under a predetermined condition, and non-limiting examples of measuring the rate of a thickness change is as follows: cutting the positive and negative electrodes into a predetermined size (ex.: 100 cm (length)×6.3 cm (width)), cutting the separator into the same size as those of the positive and negative electrodes (ex.: 100 cm (length)×6.5 cm (width)), interposing the separator between the positive and negative electrodes, and winding them into a predetermined size (ex.: 7 cm (length)×6.5 cm (width)) to form a jelly-roll. The jelly-roll is pressed at 80° C. under a pressure of 30 kgf/cm$^2$ for 3 seconds, a thickness ($T_1$) of the electrode assembly is measured with a 30 cm steel ruler, and a thickness ($T_2$) of the electrode assembly after allowed to stand at 25° C. for 48 hours is measured, and the rate of a thickness change of the electrode assembly is calculated according to Equation 1.

$$\text{Rate of a thickness change (\%)} = [(T_2-T_1)/T_1] \times 100 \quad \text{[Equation 1]}$$

According to another aspect of the present invention, an electrochemical battery includes a positive electrode, a negative electrode, an electrolyte, and a separator between the positive electrode and the negative electrode, wherein the separator is the separator according to one aspect of the present invention.

Figure 3:
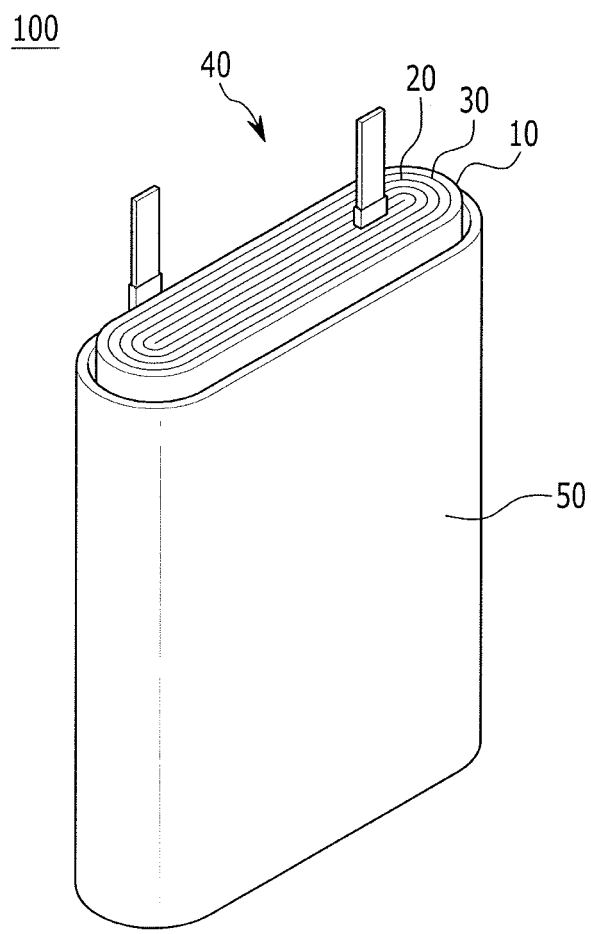
FIG. 3 is an exploded perspective view showing an electrochemical battery according to one aspect.

FIG. 3 is an exploded perspective view of an electrochemical battery according to one aspect. A prismatic battery according to one embodiment is for example described, but the present disclosure is not limited thereto and the separator may be applied to various batteries such as a pouch-type battery and a cylindrical battery. Referring to FIG. 3, a rechargeable battery 100 according to one embodiment includes a wound electrode assembly 40 including a separator 30 interposed between a positive electrode 10 and a negative electrode 20, and a case 50 housing the electrode assembly 40. The positive electrode 10, the negative electrode 20 and the separator 30 are impregnated in an electrolyte solution (not shown).

The separator 30 is the same as described above.

The positive electrode 10 includes a positive current collector and a positive active material layer formed on the positive current collector. The positive active material layer includes a positive active material, a binder, and optionally a conductive material. The positive current collector may use aluminum (Al), nickel (Ni), and the like, but is not limited thereto. The positive active material may use a compound being capable of intercalating and deintercalating lithium. Specifically at least one of a composite oxide or a composite phosphate of a metal selected from cobalt, manganese, nickel, aluminum, iron, or a combination thereof and lithium may be used. More specifically, the positive active material may use lithium cobalt oxide, lithium nickel oxide, lithium manganese oxide, lithium nickel cobalt manganese oxide, lithium nickel cobalt aluminum oxide, lithium iron phosphate, or a combination thereof. The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more. The conductive material improves conductivity of an electrode and examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 20 includes a negative current collector and a negative active material layer formed on the negative current collector. The negative current collector may use copper (Cu), gold (Au), nickel (Ni), a copper alloy, and the like, but is not limited thereto. The negative active material layer may include a negative active material, a binder and optionally a conductive material. The negative active material may be a material that reversibly intercalates/deintercalates lithium ions, a lithium metal, a lithium metal alloy, a material being capable of doping and dedoping lithium, a transition metal oxide, or a combination thereof. The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, plate-shape, flake, spherical shape or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ ($0<x<2$), a Si—C composite, a Si—Y alloy, Sn, $SnO_2$, a Sn—C composite, a Sn—Y, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like. The binder and the conductive material used in the negative electrode may be the same as the binder and conductive material of the positive electrode.

The positive electrode and the negative electrode may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent and a lithium salt. The organic solvent serves as a medium for transmitting ions taking part in the electrochemical reaction of a battery. Specific examples thereof may be selected from a carbonate-based solvent, an ester-based solvent, an ether-based solvent, a ketone-based solvent, an alcohol-based solvent, and an aprotic solvent. Examples of the carbonate-based solvent may be dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. Particularly, when the linear carbonate compounds and cyclic carbonate compounds are mixed, an organic solvent having a high dielectric constant and a low viscosity may be provided. The cyclic carbonate compound and the linear carbonate compound are mixed together in a volume ratio ranging from 1:1 to 1:9.

Examples of the ester-based solvent may be methylacetate, ethylacetate, n-propylacetate, dimethylacetate, methylpropionate, ethylpropionate, γ-butyrolactone, decanolide, valerolactone, mevalonolactone, caprolactone, and the like. Examples of the ether-based solvent may be dibutylether, tetraglyme, diglyme, dimethoxyethane, 2-methyltetrahydrofuran, tetrahydrofuran, and the like. Examples of the ketone-based solvent may be cyclohexanone, and the like, and examples of the alcohol-based solvent may be ethanol, isopropyl alcohol, and the like. The organic solvent may be used singularly or in a mixture of two or more, and when the organic solvent is used in a mixture of two or more, the mixture ratio may be controlled in accordance with a desirable cell performance. The lithium salt is dissolved in an organic solvent, supplies lithium ions in a battery, basically operates the rechargeable battery, and improves lithium ion transportation between positive and negative electrodes therein. Examples of the lithium salt may be $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, x and y are natural numbers, LiCl, LiI, $LiB(C_2O_4)_2$, or a combination thereof. The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

The electrochemical battery according to the present aspect may be a rechargeable battery, and specifically a rechargeable lithium battery such as a lithium metal rechargeable battery, a rechargeable lithium ion battery, a rechargeable lithium polymer battery, or a rechargeable lithium ion polymer battery.

A method of manufacturing the electrochemical battery according to the present aspect is not particularly limited, and a general method in this art of the present invention may be used. Non-limiting examples of a method of manufacturing the electrochemical battery are as follows: placing the organic and inorganic mixed separator including a coating layer according to the present example embodiment between a positive electrode and a negative electrode of a battery to manufacture an electrode assembly, packing it in a pouch for a polymer battery, and filling an electrolyte solution in the pouch for a polymer battery.

In addition, the separator according to an example embodiment of the present aspect may have a thermal shrinkage ratio of less than or equal to 5% respectively in a machine direction (MD) and a transverse direction (TD) after allowed to stand at 150° C. for 1 hour, specifically, less than or equal to 4%, for example, less than or equal to 3%, and more specifically, less than or equal to 2.5%. Within the range, the separator may have heat resistance for securing stability, and a short circuit may be prevented by suppressing shrinkage of the base film.

In addition, a method of measuring the thermal shrinkage ratio of the separator according to an example embodiment of the present aspect has no particular limit but may include any common method used in a related art to the present invention. Non-limiting examples of the method of measuring the thermal shrinkage ratio are as follows: the separator is cut into a size of a width (MD) about 5 cm×a length (TD) about 5 cm and stored in a 150° C. chamber for 1 hour, and a shrinkage of the separator in a machine direction and a transverse direction is measured to calculate the thermal shrinkage ratio.

In addition, the separator according to an example embodiment of the present aspect may have a tensile strength of greater than or equal to 1400 kgf/cm$^2$ in the machine direction and 1100 kgf/cm$^2$ in the transverse direction and specifically, greater than or equal to 1500 kgf/cm$^2$ in the machine direction and greater than or equal to 1200 kgf/cm$^2$ in the transverse direction. More specifically, the tensile strength may be in a range of 1500 kgf/cm$^2$ to 2000 kgf/cm$^2$ in the machine direction and in a range of 1200 kgf/cm$^2$ to 1800 kgf/cm$^2$ in the transverse direction. Within the range, the tensile strength of the separator may be effectively controlled.

A method of measuring the tensile strength of the separator has no particular limit but may include any common method used in a related art to the present invention. Non-limiting examples of the method of measuring the tensile strengths of the separator are as follows: each prepared separator is cut into a rectangle shape of a width (MD) 10 mm×a length (TD) 50 mm at ten different points to obtain ten specimens, and each specimen is mounted on UTM (a tensile strength tester), clipped to have a measuring length of 20 mm, and pulled to measure average tensile strength in the machine direction and the transverse direction.

In addition, the separator according to an example embodiment of the present aspect may have puncture strength of greater than or equal to 300 gf, specifically 300 gf to 400 gf, and more specifically, 320 gf to 400 gf. Within the range, the puncture strength may be controlled, and a method of measuring the puncture strength of the separator has no particular limit.

The method of measuring the puncture strength may be performed in a common method used in a related art to the present invention, and non-limiting examples of the method are as follows: the separators are cut into a size of a width (MD) 50 mm×a length (TD) 50 mm at ten different points to prepare ten specimens, each specimen is put on a 10 cm hole by using a KATO Tech G5 equipment, and puncture strength of each specimen is three times measured while pushed down with a 1 mm probe needle and averaged.

DETAILED DESCRIPTION OF THE EMBODIMENTS

Hereinafter, Examples, Comparative Examples and Experimental Examples are provided in order to illustrate the present invention in detail. However, the following Examples, Comparative Examples, and Experimental Examples are examples of the present invention and are not to be construed as limiting the present invention.

Example 1

Preparation of First Polymer Solution

A polymerized acryl-based copolymer binder (Tg: 34-39° C.) obtained by polymerizing butyl methacrylate (BMA), methyl methacrylate (MMA), vinyl acetate (VAc) in a mole ratio of 4/1/5 in a solid amount of 10 wt % was added to acetone, and the mixture was stirred at 40° C. for 2 hours with an agitator, preparing a first polymer solution.

Preparation of Inorganic Dispersion Liquid $Al_2O_3$ (LS235, Nippon Light Metal Company, Ltd.) in an amount of 25 wt % was added to acetone and dispersed through milling with a bead mill at 25° C. for 2 hours, preparing an inorganic dispersion liquid.

Preparation of Coating Liquid (Coating Slurry)

The first polymer solution and the inorganic dispersion liquid were mixed in a weight ratio of 1:2 and stirred with a power blender at 25° C. for 2 hours, preparing a coating liquid.

Formation of Coating Layer and Manufacture of Separator

The coating liquid was coated on both sides of a 9 μm-thick polyethylene film (W Scope, PE) in a dip coating method, dried at 80° C. for one minute, forming a separator having each 2 μm-thick coating layer on both sides and thus a total thickness of 13 μm.

Example 2

A separator was manufactured according to the same method under the same condition as Example 1 except for preparing the coating liquid by adding PVdF-HFP having a weight average molecular weight (Mw) of about 600.00-700.00 g/mol (21216, Solvay) in an amount of 10 wt % to acetone (Daejung Chemicals & Metals) and stirring the mixture with an agitator at 25° C. for 4 hours to prepare a second polymer solution and then, mixing the first polymer solution, the second polymer solution, and the inorganic dispersion liquid in a weight ratio of 2.8:1:7 and stirring the mixture with a power blender at 25° C. for 2 hours.

Example 3

A separator was manufactured according to the same method under the same condition as Example 1 except for preparing the coating liquid by adding a PVdF-based binder having a weight average molecular weight of 1,000,000-1,200,000 g/mol (KF 9300, Kureha Corp.) as a third polymer binder in an amount of 7 wt % to acetone and stirring the mixture at 40° C. for 4 hours with an agitator to prepare a third polymer solution and then, mixing the first polymer solution, the third polymer solution, and the inorganic dispersion liquid in a weight ratio of 2.8:1:7 and stirring the mixture with a power blender at 25° C. for 2 hours.

Example 4

A separator was manufactured according to the same method under the same condition as Example 1 except for preparing the coating liquid by adding a PVdF-based binder weight average molecular weight of 1,000,000-1,200,000 g/mol (KF 9300, Kureha Corp.) as a third polymer binder in an amount of 7 wt % to acetone and stirring the mixture with an agitator at 40° C. for 4 hours to prepare a third polymer solution and then, mixing the first polymer solution, the third polymer solution, and the inorganic dispersion liquid in a weight ratio of 1.63:1:4.7 and stirring the mixture with a power blender at 25° C. for 2 hours.

Example 5

A separator was manufactured according to the same method under the same condition as Example 1 except for preparing the coating liquid by adding a PVdF-based binder weight average molecular weight of 1,000,000-1,200,000 g/mol (KF 9300, Kureha Corp.) as a third polymer binder in an amount of 7 wt % to acetone and stirring the mixture with an agitator at 40° C. for 4 hours to prepare a third polymer solution and then, mixing the first polymer solution, the third polymer solution, and the inorganic dispersion liquid in a weight ratio of 1.05:1:35 and stirring the mixture with a power blender at 25° C. for 2 hours.

Example 6

A separator was manufactured according to the same method under the same condition as Example 1 except for preparing the coating liquid by adding a PVdF-based binder weight average molecular weight of 1,000,000-1,200,000 g/mol (KF 9300, Kureha Corp.) as a third polymer binder in an amount of 7 wt % to acetone and stirring the mixture with an agitator at 40° C. for 4 hours to prepare a third polymer solution and then, mixing the first polymer solution, the third polymer solution, and the inorganic dispersion liquid in a weight ratio of 0.7:1:2.8 and stirring the mixture with a power blender at 25° C. for 2 hours.

Example 7

A separator was manufactured according to the same method under the same condition as Examples 1 to 3 except for preparing the coating liquid by mixing the first polymer solution, the third polymer solution, and the inorganic dispersion liquid in a weight ratio of 2.5:1:2.14:10 and stirring the mixture with a power blender at 25° C. for 2 hours.

Comparative Example 1

A separator was manufactured according to the same method under the same condition as Example 2 except for preparing the coating liquid by mixing the second polymer solution and the inorganic dispersion liquid in a weight ratio of 1:2 and stirring the mixture with a power blender at 25° C. for 2 hours.

Comparative Example 2

A separator was manufactured according to the same method under the same condition as Example 3 except for preparing the coating liquid by mixing the third polymer solution and the inorganic dispersion liquid in a weight ratio of 1:2 and stirring the mixture with a power blender at 25° C. for 2 hours.

Comparative Example 3

A separator was manufactured according to the same method under the same condition as Examples 1 to 3 except for preparing the coating liquid by mixing the second polymer solution, the third polymer solution, and the inorganic dispersion liquid in a weight ratio of 1.17:1:4.67 and stirring the mixture with a power blender at 25° C. for 2 hours.

Hereinafter, the compositions used in Examples and Comparative Examples are provided in Table 1.

TABLE 1

| Example/Comparative Example | Binder | | | | Inorganic material $Al_2O_3$ |
|---|---|---|---|---|---|
| | acryl-based copolymer (Tg: 34-39° C.) | PVdF-HFP 21216 | PVdF-based 9300 | acryl-based copolymer:PVdF-based binder (weight ratio) | |
| Example 1 | ○ | — | — | — | ○ |
| Example 2 | ○ | ○ | — | 7.4:2.6 | ○ |
| Example 3 | ○ | — | ○ | 8:2 | ○ |
| Example 4 | ○ | — | ○ | 7:3 | ○ |
| Example 5 | ○ | — | ○ | 6:4 | ○ |
| Example 6 | ○ | — | ○ | 5:5 | ○ |
| Example 7 | ○ | ○ | ○ | 5:5 | ○ |
| Comparative Example 1 | — | ○ | — | — | ○ |
| Comparative Example 2 | — | — | ○ | — | ○ |
| Comparative Example 3 | — | ○ | ○ | — | ○ |

Experimental Example 1

Measurement of A Rate of a Thickness Change

The separators according to Examples and Comparative Examples were respectively disposed between positive and negative electrodes to manufacture each electrode assembly, and its thickness and a rate of a thickness change were measured in the following method.

The positive electrode was manufactured by coating LCO ($LiCoO_2$) as a positive active material to respectively be 94 μm thick on both sides of a 20 μm thick aluminum foil and then, drying and compressing them to have a total thickness of 114 μm, and the negative electrode was manufactured by coating natural graphite and artificial graphite in a ratio of 1:1 as a negative active material to be 120 μm thick in total on both sides of a 10 μm-thick copper foil to have a total thickness of 130 μm.

The positive electrode and the negative electrode were respectively cut to have a size of 100 cm (length)×6.3 cm (width), the separators according to Examples and Comparative Examples were respectively cut to have a size of 100 cm (length)×6.5 cm (width) and interposed between the positive electrode and the negative electrode, and then, wound to have a size of 7 cm (length)×6.5 cm (width), forming each jelly roll-shaped electrode assembly.

Each electrode assembly according to Examples and Comparative Examples was pressed at 80° C. with a pressure of 30 kgf/cm² for 3 seconds, and its thickness was measured by using a 30 cm steel ruler ($T_1$).

After the pressing, the thickness was measured at 25° C. by every 12 hour, the thickness after 48 hours was regarded as $T_2$, and then, its rate of thickness change was calculated according to the following equation 1.

Rate of a thickness change (%)=[($T_2-T_1$)/$T_1$]×100   [Equation 1]

Experimental Example 2

Measurement of Thermal Shrinkage Ratio of Separator

The thermal shrinkage ratios of the separators according to Examples and Comparative Examples were measured in the following method.

Each separator according to Examples and Comparative Examples was cut into a size of a width (MD) 5 cm×a length (TD) 5 cm, obtaining ten specimens in total. Each specimen was stored in a 150° C. chamber for 1 hour, its shrinkage in the machine direction (MD) and the transverse direction (TD) was measured and averaged, obtaining its thermal shrinkage ratio.

Experimental Example 3

Measurement of Tensile Strength of Separator

Tensile strength of the separators according to Examples and Comparative Examples was measured in the following method.
The separators according to Examples and Comparative Examples were respectively cut into a rectangle with a size of a width (MD) 10 mm×a length (TD) 50 mm at ten different points to obtain ten specimens, the specimens were respectively mounted on UTM (a tensile tester) and clipped to have a measurement length of 20 mm and then, pulled and measured regarding average tensile strength in the machine direction (MD) and the transverse direction (TD).

Experimental Example 4

Puncture Strength Measurement of Separator

Puncture strength of the separators according to Examples and Comparative Examples was measured by performing the following method.
Each separator according to Examples and Comparative Examples was cut into a size of a width (MD) 50 mm×a length (TD) 50 mm at ten different points to obtain ten specimens, each specimen was put on a 10 cm hole by using a KATO tech G5 equipment, and then, its strength was measured when punctured while pushed with a 1 mm probe needle. The puncture strength of each specimen was three times measured and then, averaged.
The results according to Experimental Examples 1 to 4 are provided in Table 2.

relative to its initial thickness and thus showed excellent thermal shrinkage, tensile strength, and puncture strength as well as secured stability for a long time.
Accordingly, a process inferiority rate during manufacture of the separators according to the embodiments may be improved, and performance of a battery may be provided.
On the other hand, the separators having a coating layer containing only a polyvinylidene fluoride-based binder (Comparative Examples 1 to 3) showed large a rate of a thickness change and thermal shrinkage ratio and turned out not to prevent a short circuit of electrodes or secure shape stability when used in a battery.
As described above, specifics of the present invention is described in detail, and this detailed description is only exemplary Examples to those who have common knowledge in a related art but does not limit the range of the present invention. Accordingly, substantial range of the present invention may be defined by claims and their equivalents.

What is claimed is:
1. A separator comprising a base film and a coating layer including an organic binder and an inorganic particle on one surface or both surfaces of the base film,
wherein the organic binder includes an acryl-based copolymer and a polyvinylidene fluoride-based binder, wherein a weight ratio of the acryl-based copolymer and the polyvinylidene fluoride-based binder is 5:5 to 8:2,
wherein the polyvinylidene fluoride-based binder has a weight average molecular weight of 500,000 g/mol to 1,500,000 g/mol,
wherein the acryl-based copolymer has a glass transition temperature (Tg) of 30° C. to less than 60° C.,
wherein the acryl-based copolymer includes a repeating unit derived from a butyl (meth)acrylate monomer and a methyl (meth)acrylate monomer and a repeating unit derived from a vinyl acetate monomer,
wherein the acryl-based copolymer is prepared by polymerizing the butyl (meth)acrylate monomer, the methyl

| Example/Comparative Example | Initial thickness (μm) | A rate of a thickness change (%) | | | | Thermal shrinkage ratio (%) | | Tensile strength (kgf/cm$^2$) | | Puncture strength (gf) |
|---|---|---|---|---|---|---|---|---|---|---|
| | | 12 hr | 24 hr | 36 hr | 48 hr | MD | TD | MD | TD | |
| Example 1 | 9 | <1 | <1 | <1 | <1 | 2 | 2 | 1517.00 | 1230.97 | 370 |
| Example 2 | 9 | <2 | <2 | <2 | <2 | 2 | 2 | 1463.40 | 1205.51 | 352 |
| Example 3 | 9 | <2 | <2 | <2 | <2 | 2 | 2 | 1518.33 | 1188.80 | 362 |
| Example 4 | 9 | <2 | <2 | <2 | <2 | 2 | 2 | 1702.69 | 1396.36 | 356 |
| Example 5 | 9 | <2 | <2 | <2 | <2 | 2 | 2 | 1661.53 | 1318.54 | 362 |
| Example 6 | 9 | <2 | <2 | <2 | <2 | 2 | 2 | 1602.44 | 1277.67 | 347 |
| Example 7 | 9 | <2 | <2 | <2 | <2 | 2 | 2 | 1748.74 | 1334.62 | 358 |
| Comparative Example 1 | 9 | >5 | >5 | >5 | >5 | 20 | 24 | 1658.98 | 1200.96 | 374 |
| Comparative Example 2 | 9 | >3 | >3 | >3 | >3 | 20 | 24 | 1633.02 | 1213.17 | 371 |
| Comparative Example 3 | 9 | >3 | >3 | >3 | >3 | 20 | 24 | 1640.71 | 1379.48 | 380 |

Referring to Table 2, the separators including a coating layer containing an acryl-based copolymer having a glass transition temperature (Tg) of less than or equal to 80° C. and an inorganic particle (Examples 1 to 7) showed less than or equal to 3% of a rate of a thickness change of a thickness when an electrode assembly was pressed at a high temperature under a high pressure and allowed to stand for 48 hours (meth)acrylate monomer, and the vinyl acetate monomer in a mole ratio of 3.5 to 4.5:0.5 to 1.5:4 to 6, and
wherein a rate of a thickness change of the separator according to Equation 1 is less than or equal to 3%, Rate of a thickness change (%)=[($T2-T1$)/$T1$]×100    [Equation 1]

wherein, in Equation 1, T1 is a thickness of an electrode assembly that is provided by interposing a separator between a positive electrode and a negative electrode, sequentially stacking the positive electrode, the separator, and the negative electrode, winding the stack several times to have a size of 7 cm (length)×6.5 cm (width) to provide a jelly-roll shaped electrode assembly, and pressing the electrode assembly at 60° C. to 100° C. with a pressure of 10 kgf/cm$^2$ to 50 kgf/cm$^2$ for 1 second to 5 seconds, and T2 is a thickness of an electrode assembly that is provided by being allowed to stand at 15° C. to 30° C. for 48 hours after the pressing.

2. An electrochemical battery comprising the separator of claim 1.

3. A separator, comprising:
a base film; and
a coating layer including an acryl-based copolymer and a polyvinylidene fluoride-based binder, wherein a weight ratio of the acryl-based copolymer and the polyvinylidene fluoride-based binder is 5:5 to 8:2, the polyvinylidene fluoride-based binder having a weight average molecular weight of 500,000 g/mol to 1,500,000 g/mol, the acryl-based binder having a glass transition temperature (Tg) of 30° C. to less than 60° C., wherein the acryl-based copolymer includes a repeating unit derived from a butyl (meth)acrylate monomer and a methyl (meth)acrylate monomer and a repeating unit derived from a vinyl acetate monomer; and
an inorganic particle, on one surface or both surfaces of the base film,
wherein the acryl-based copolymer is prepared by polymerizing the butyl (meth)acrylate monomer, the methyl (meth)acrylate monomer, and the vinyl acetate monomer in a mole ratio of 3.5 to 4.5:0.5 to 1.5:4 to 6.

4. The separator of claim 3, wherein the polyvinylidene fluoride-based binder is one or more selected from a polyvinylidene fluoride (PVDF) homopolymer, polyvinylidene fluoride-hexafluoropropylene (PVDF-HFP), polyvinylidene fluoride-trichloroethylene (PVDF-TCE), polyvinylidene fluoride-chlorotrifluoroethylene (PVDF-CTFE).

5. The separator of claim 3, wherein after placing the separator at 150° C. for 1 hour, a thermal shrinkage ratio in a machine direction (MD) is less than or equal to 5% and a thermal shrinkage ratio in a transverse direction (TD) is less than or equal to 5%.

6. The separator of claim 3, wherein the separator has a tensile strength in a machine direction of greater than or equal to 1400 kgf/cm$^2$, and a tensile strength in a transverse direction of greater than or equal to 1100 kgf/cm$^2$.

7. The separator of claim 3, wherein the separator has a puncture strength of greater than or equal to 300 gf.

8. The separator of claim 3, wherein the base film is a polyolefin-based film.

9. An electrochemical battery comprising the separator of claim 3.

10. The electrochemical battery of claim 9, wherein the electrochemical battery is a rechargeable lithium polymer battery or a rechargeable lithium ion polymer battery.

* * * * *